United States Patent
Shvodian (10) Patent No.: US 11,128,433 B1
(45) Date of Patent: Sep. 21, 2021

(54) METHOD AND SYSTEM TO FACILITATE USE OF CONFLICTING TDD CONFIGURATIONS

(71) Applicant: Sprint Spectrum L.P., Overland Park, KS (US)

(72) Inventor: William Shvodian, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 174 days.

(21) Appl. No.: 16/599,365

(22) Filed: Oct. 11, 2019

(51) Int. Cl.
  *H04L 5/14* (2006.01)
  *H04W 4/021* (2018.01)
  *H04W 16/18* (2009.01)
  *H04L 5/00* (2006.01)

(52) U.S. Cl.
  CPC .......... *H04L 5/1469* (2013.01); *H04L 5/0082* (2013.01); *H04W 4/021* (2013.01); *H04W 16/18* (2013.01)

(58) Field of Classification Search
  CPC ....... H04L 5/1469; H04L 5/0082; H04L 5/14; H04L 5/1423; H04W 4/021; H04W 16/18
  See application file for complete search history.

(56) References Cited

U.S. PATENT DOCUMENTS

| | | | |
|---|---|---|---|
| 7,924,748 B2* | 4/2011 | Yomo | H04W 52/24 370/276 |
| 7,969,926 B2* | 6/2011 | Choi | H04B 7/15542 370/315 |
| 9,154,287 B1 | 10/2015 | Cummings, III et al. | |
| 2006/0077931 A1* | 4/2006 | Lee | H04L 5/14 370/329 |
| 2010/0087221 A1 | 4/2010 | Srinivasan et al. | |
| 2011/0026415 A1 | 2/2011 | Kamuf et al. | |
| 2012/0294168 A1 | 11/2012 | Freda et al. | |
| 2014/0177485 A1 | 6/2014 | Wang et al. | |

FOREIGN PATENT DOCUMENTS

WO  WO 2018/031746  2/2018

\* cited by examiner

*Primary Examiner* — Brenda H Pham (57) ABSTRACT

When a first coverage area will use a first TDD configuration and a second coverage area will use a second TDD configuration that is different than the first TDD configuration, a guard band operatively separating the first and second coverage areas (in frequency and/or in space) will be configured with an enhanced TDD configuration that is specially structured to be consistent with both the first and second TDD configurations. Namely, the enhanced TDD configuration could be downlink just when both the first and second TDD configurations are downlink and uplink just when both the first and second TDD configurations are uplink, and can unused at other times.

20 Claims, 7 Drawing Sheets

METHOD AND SYSTEM TO FACILITATE USE OF CONFLICTING TDD CONFIGURATIONS

BACKGROUND

A typical cellular wireless network includes a number of access nodes configured to provide wireless coverage areas in which to serve user equipment devices (UEs) such as cell phones, tablet computers, tracking devices, embedded wireless modules, and other wirelessly equipped devices (whether or not user operated). In turn, each access node could sit as a node on a core access network that includes entities such as a network controller and a gateway system providing connectivity with one or more external transport networks such as the Public Switched Telephone Network (PSTN) and/or the Internet. With this arrangement, a UE within coverage of the system could engage in air interface communication with an access node and could thereby communicate via the access node with various remote network entities or with other UEs served by the access node.

Such a network could operate in accordance with a particular radio access technology, with air-interface communications from the access nodes to UEs defining a downlink or forward link and air-interface communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the radio access technology, each access node could provide service on one or more carriers, with each carrier spanning one or more radio-frequency (RF) channels for carrying communications wirelessly between the access node and UEs. In particular each carrier could be frequency division duplex (FDD), defining separate frequency channels for downlink and uplink use, or time division duplex (TDD), defining a single frequency channel multiplexed over time between downlink and uplink use.

Each such frequency channel could be characterized by its position and width in RF spectrum, such as by a designated center frequency and bandwidth. Further, each channel could be structured to define various physical resources for carrying communications. For instance, under an example radio access technology, each channel could be divided over time into frames, subframes, timeslots, and symbol segments, and could be divided over frequency into subcarriers. As a result, each channel could define an array of time-frequency resource elements in which subcarriers can be modulated to carry data communications. Further, within each subframe and timeslot, these resource elements could be divided into groups defining physical resource blocks (PRBs) that could be allocated to carry data on an as-needed basis.

Further, each access node could have a respective antenna structure that is configured to transmit and receive electromagnetic signals on one or more such carriers in a region defined by an antenna pattern or radiation pattern. The antenna pattern could define a geographic scope of coverage in which the access node can engage in downlink transmission to UEs and receive uplink transmission from UEs.

Thus, a coverage area provided by an access node could be characterized in the frequency domain by the coverage area's carrier and in the spatial domain by the coverage area's geographic scope of coverage. More generally, a representative wireless coverage area could be provided by one or more access nodes (perhaps as a composite of individual coverage areas provided by individual ones of the access nodes) and could be characterized in the frequency domain by a range of frequency on which the coverage is provided and in the spatial domain by a geographic area of the coverage.

OVERVIEW

When an access node's coverage area operates on a TDD carrier, the carrier could be structured with a particular TDD configuration (frame configuration) defining a sequence of equal-duration subframes and establishing which subframes are for downlink use and which subframes are for uplink use. Further, the TDD configuration may designate certain subframes as special subframes that are part downlink and part downlink, to help facilitate transition from downlink to uplink operation. Thus, a representative TDD configuration could establish for each subframe per frame whether the subframe is a downlink subframe (D), an uplink subframe (U), or a special subframe (S).

Various TDD configurations could be feasible. In LTE, for instance, the air interface on a TDD carrier defines a continuum of 10-millisecond frames, each divided into ten 1-millisecond subframes, and LTE defines seven standard TDD configurations as set forth in Table 1.

TABLE 1

| TDD Configuration | Subframe Number (0-9) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Non-standard implementations and/or other radio access technologies may define these or other frame structures and other TDD configurations as well.

In practice, an access node that provides a coverage area on a carrier having any such TDD configuration could broadcast in the coverage area a system information message that specifies the carrier's TDD configuration, so that UEs served by the access node in the coverage area could determine the TDD configuration and operate accordingly. For instance, an access node could broadcast a System Information Block (SIB) message in subframe 0 of each frame and could include in the SIB message a specification of the carrier's TDD configuration, such as a frame configuration (FC) number. Thus, a UE that is within that coverage area of the access node could read that broadcast SIB message to determine the TDD configuration of the coverage area's carrier. Alternatively, a UE might determine the TDD configuration of a carrier in other ways, such as by monitoring to determine the subframes in which the access node transmits per frame.

In an example cellular wireless network, each access node providing coverage on a TDD carrier could be configured to operate with a particular TDD configuration on that carrier. Each such TDD configuration could be statically set by engineering design or the like. Or alternatively, the TDD configuration could be set dynamically to help accommodate varying traffic profiles. For example, at times when an access node serves heavier downlink traffic, the access node may configure the TDD carrier to have a more downlink-centric TDD configuration such as FC2, FC4, or FC5. Whereas, at times when the access node serves heavier uplink traffic, the access node may configure the TDD carrier to have a more uplink-centric TDD configuration such as FC0, FC1, or FC6.

One technological issue with TDD operation is that, if two coverage areas operate on the same TDD carriers or adjacent TDD carriers and are spatially close to each other (e.g., partly or fully collocated) but use different TDD configurations than each other, interference can occur each time there is concurrently downlink communication in one coverage area and uplink communication in the other coverage area. For example, downlink communication in one coverage area could interfere with concurrent uplink reception in the other coverage area on the same carrier or on an adjacent carrier. And uplink communication in one coverage area could interfere with concurrent downlink reception in the other coverage area on the same carrier or an adjacent carrier.

Disclosed herein is a mechanism to help address this issue. In accordance with the disclosure, when a first coverage area will use a first TDD configuration and a second coverage area will use a second TDD configuration that is different than the first TDD configuration, a guard band operatively separating the first and second coverage areas will be configured with an enhanced TDD configuration that is specially structured to be consistent with both the first and second TDD configurations.

The guard band could operatively separate the first and second coverage areas in the frequency domain and/or in the spatial domain.

In the frequency domain, for instance, the guard band could be a range of frequency that separates a first frequency range on which the first coverage area operates from a second frequency range on which the second coverage area operates. For instance, if the first coverage area operates on a lower frequency than the second coverage area, with the high-end frequency of the first coverage area being $F_1$ and the low-end frequency of the second coverage area being $F_2$, the guard band could be a frequency guard band defined as the frequency range from $F_1$ to $F_2$, among other possibilities.

In the spatial domain, the guard band could be a geographic area that physically separates the geographic scope of the first coverage area (optimally including any serving access nodes) from the geographic scope of the second coverage area (also optimally including any serving access nodes). For instance, the first coverage area might cover a first geographic area, the second coverage area might cover a second geographic area, and the guard band could be a spatial guard band defined as the geographic area between the first and second geographic areas.

Coverage in such a guard band could then optimally be configured to use the enhanced TDD configuration that is consistent with both the first TDD configuration used by the first coverage area and the second TDD configuration used by the second coverage area. As presently contemplated, this could be done by configuring the enhanced TDD configuration in the guard band (i) to be downlink just at times when both the first coverage area with the first TDD configuration is downlink and the second coverage area with the second TDD configuration is downlink, (ii) to be uplink just at times when both the first coverage area with the first TDD configuration is uplink and the second coverage area with the second TDD configuration is uplink, and (iii) to be unused at any time when one of the first and second coverage areas is downlink and the other of the first and second coverage areas is uplink.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a wireless communication network that includes multiple access nodes and is configured to provide coverage and service on RF spectrum defining three frequency-sequential frequency bands and within a geographic region defining three spatially-sequential areas. It should be understood, however, that the principles disclosed herein could extend to apply in other scenarios as well, such as with a different quantity of frequency bands and/or a different quantity of spatial areas.

Further, other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processing unit executing instructions stored in non-transitory data storage, along with associated circuitry or other hardware, for instance.

Figure 1:
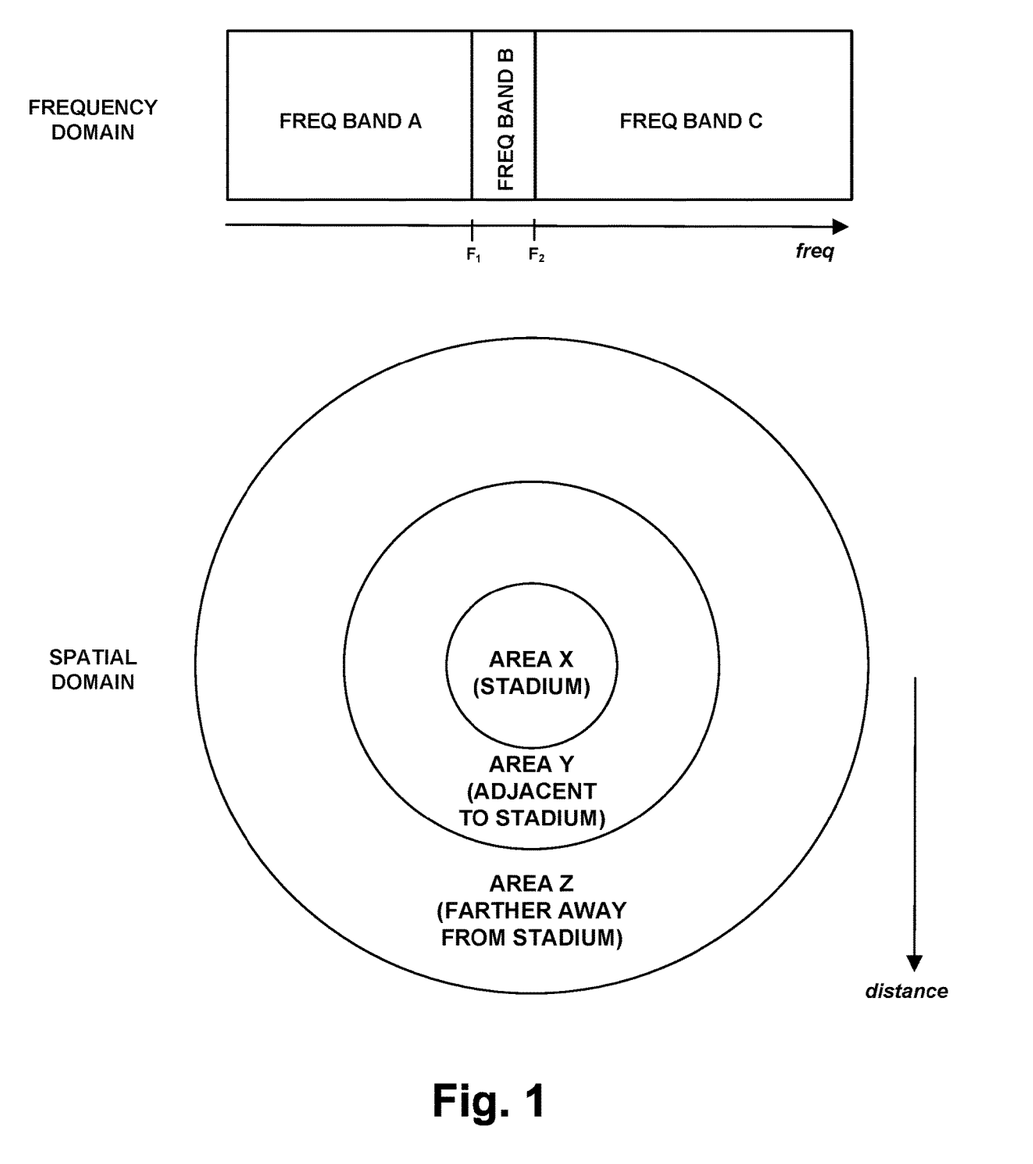
FIG. 1 is an illustration of example frequency-domain and spatial-domain representations of coverage provided by an example network.

FIG. 1 depicts example frequency-domain and spatial-domain representations of coverage provided by the example network.

The top portion of FIG. 1 illustrates a range of RF spectrum divided into three sequential frequency bands, labeled frequency band A, frequency band B, and frequency band C. Each of these frequency bands ranges from a low-end frequency to a high-end frequency and could encompass one or more carriers on which wireless coverage could be provided. Further, the three frequency bands are shown directly adjacent to each other, so that the high-frequency end of frequency band A and the low-frequency end of frequency band B are at the same frequency, $F_1$, and the high-frequency end of frequency band B and the low-frequency end of frequency band C are at the same frequency, $F_2$. However, there could be some variation to this. For instance, there might be other intervening frequencies.

The bottom portion of FIG. 1 illustrates a geographic region, perhaps a metropolitan region, divided into three spatial areas labeled area X, area Y, and area Z. Area X is in the middle, area Y is a ring around area X, and area Z is a ring around area Y. More particularly, for discussion purposes, the figure shows the area X as being the geographic area of an example stadium, where it might be desirable at times to provide special a TDD configuration. Further, the figure shows area Y as being a geographic area directly adjacent to the stadium, perhaps an area that surrounds the stadium. And the figure shows area Z as being a geographic area away from the stadium, spatially beyond area Y.

Each of these areas could be defined by coverage provided by one or more access nodes, which could operate on one or more of the frequency bands noted above. For instance, one or more access nodes (e.g., small cells) could be situated and configured to provide coverage in area X (within the stadium), one or more other access nodes could be situated and configured to provide coverage in area Y (the adjacent surrounding area), and one or more other access nodes could be situated and configured to provide coverage in area Z (beyond that surrounding area area). Because the geographic scope of coverage provided by access nodes could take various forms and could spatially overlap with each other, the shape and division between the three example areas in practice would almost certainly be less ideal than shown in the figure.

Figure 2:
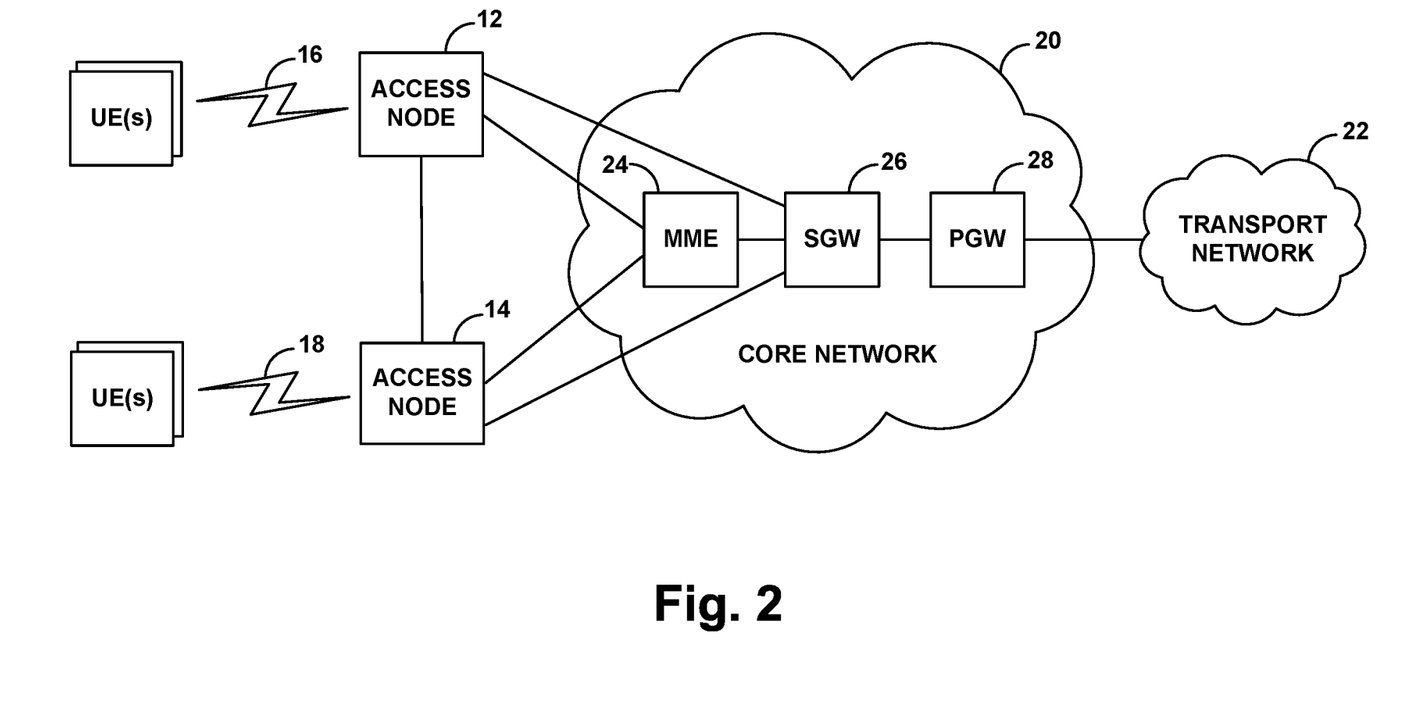
FIG. 2 is a simplified block diagram of a wireless communication network in which the coverage shown in FIG. 1 could be provided.

FIG. 2 is next a simplified block diagram of an example wireless communication network that could be configured to provide coverage and service on the frequencies and in the areas as shown in FIG. 1.

FIG. 2 depicts two of many example access nodes 12, 14 that could be included in the network. Each access node could be a macro access node, a small cell access node, or other type of access node designed to provide wireless coverage in which to serve user UEs. The access nodes could be macro access nodes, small cell access nodes, or other types of access nodes configured to serve UEs in accordance with one or more defined radio access technologies, and the access nodes could vary in form from each other. In line with the discussion above, each access node could have a respective antenna structure that is configured to transmit and receive electromagnetic signals on one or more carriers 16, 18 in a region defined by an antenna pattern or radiation pattern, so as to provide one or more coverage areas each on defined frequency and with a defined geographic scope of coverage. Further, these and other attributes of coverage and operation provided by each access node may vary from time to time as well.

In an example implementation, the various access nodes could be interconnected with one or more core networks 20, which could provide connectivity with one or more external transport networks 22 such as the Internet for instance. Each such core network could take various forms, examples of which include without limitation an Enhanced Packet Core (EPC) network and a Next Generation Core (NGC) network. As shown by way of example, the core network could include a mobility management entity (MME) 24, a serving gateway (SGW) 26, and a packet-data-network gateway (PGW) 28, among other nodes. With this arrangement, each access node could have a communication interface with the MME, with the SGW, and with the each other access node, the MME could have a communication interface with the SGW, the SGW could have a communication interface with the PGW, and the PGW could provide connectivity with a transport network 22.

As each of various UEs enter into coverage of any such access node, the UE could discover coverage of the access node on a given carrier, such as by reading broadcast signaling from the access node on the carrier, and could then engage in random access and connection signaling with the access node to establish a connection through which the access node could then serve the UE. Further, if the UE is not yet registered for service, the UE could engage in attachment signaling with the MME via the access node, and the MME could coordinate setup of one or more user-plane bearer tunnels between the UE and the PGW including for each a data radio bearer over the air between the access node and the UE and an access bearer through the core network between the access node and the PGW. The access node may then serve the UE on the carrier, coordinating use of air interface resources such as PRBs to carry data to and from the UE.

Further in line with the discussion above, each carrier on which any such access node provides coverage could be a TDD carrier structured with a particular TDD configuration defining a sequence of downlink-uplink time intervals. For instance, considering the example TDD configurations shown above in Table 1, each carrier might be structured with any such TDD configuration. Numerous other TDD configurations are possible as well, in terms of the downlink-uplink sequencing, in terms of the time interval definitions, and in other aspects.

As noted above, the present disclosure could help to address the technological problem of having two coverage areas operate on the same or nearby frequencies and provide coverage in the same or nearby physical areas but using different TDD configurations than each other. Without limitation, for instance, an example scenario could be where two spatially collocated coverage areas operate on adjacent frequency bands but with different TDD configurations, and another example scenario could be where two spatially adjacent coverage areas operate on the same frequency band but with different TDD configurations.

As a particular example, consider the scenario described above, using the frequencies and areas shown in FIG. 1. In particular, consider a scenario where frequency bands A, B, and C are implemented by access nodes throughout the metropolitan region including in area X, in area Y, and in area Z. And assume that, throughout those areas and on all three of those frequency bands, a first TDD configuration (e.g., FC2) is normally used, but that there is a desire to implement a second, different TDD configuration (e.g., FC1) in area Z at the time of a sports event in the stadium, so as to provide a different percentage of uplink capacity there than the first TDD configuration would provide.

One way to achieve this goal would be for the network provider to configure frequency band A to use the first TDD configuration throughout the metropolitan region, to configure frequency band C to use the second TDD configuration throughout the metropolitan region, and to not use frequency band B throughout the metropolitan area—i.e., to treat frequency band B as a frequency guard band between operation on frequency bands A and C, without any downlink or uplink service on frequency band B. The network provider could configure access nodes throughout the region accordingly.

Figure 3:
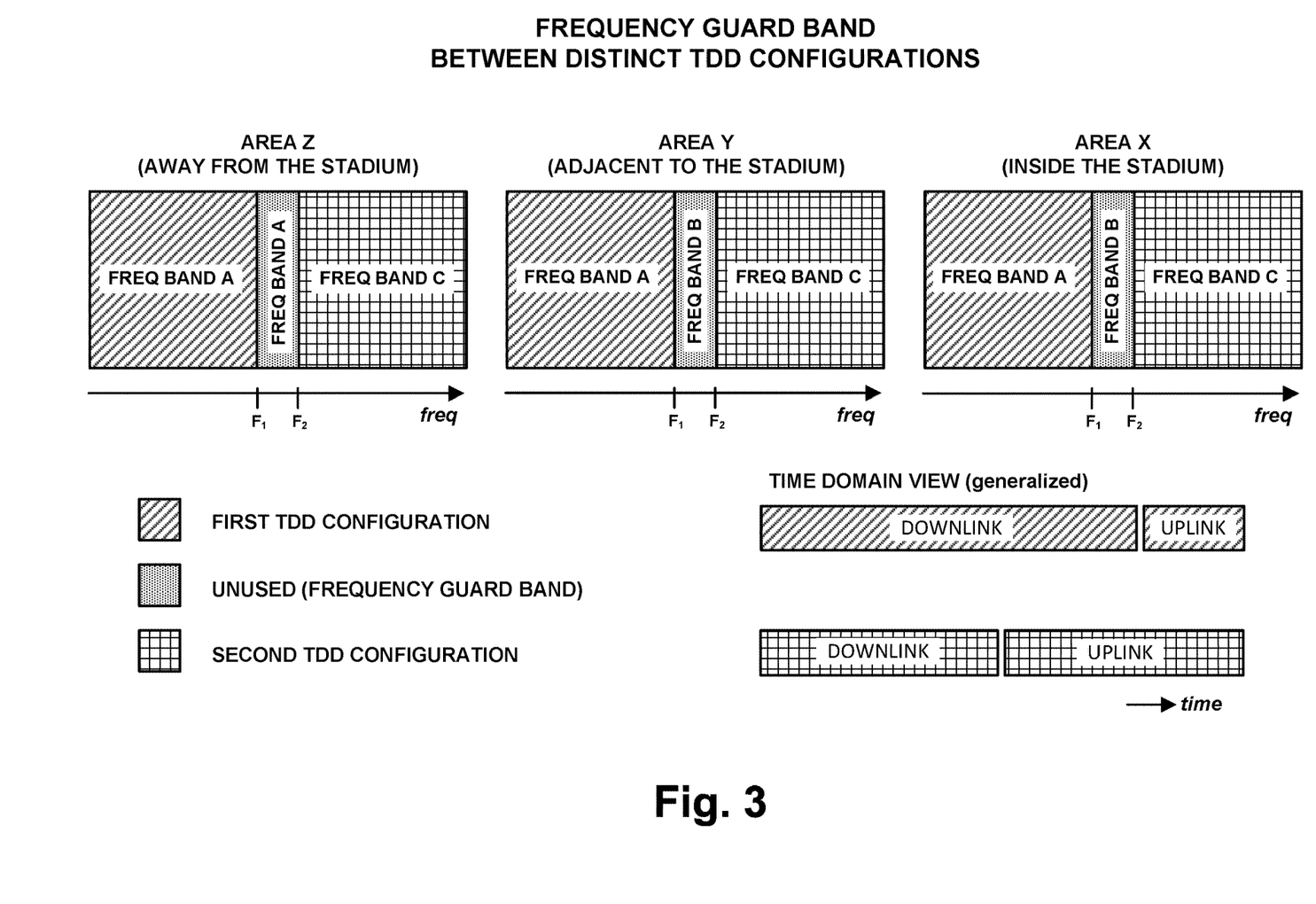
FIG. 3 is an illustration of a frequency guard band between distinct TDD configurations.

FIG. 3 illustrates how this solution could play out in practice. The top part of FIG. 3 shows three instances of frequency bands A, B, and C, respectively representing those frequency bands as they would be configured in area X (in the stadium), in areas Y (adjacent to the stadium), and in area Z (farther away from the stadium). And the bottom part of FIG. 3 shows a time domain view with a simplified example representation of some downlink and uplink time segments. As illustrated, in each of areas X, Y, and Z, frequency band A is configured with the first TDD configuration, frequency band C is configured with the second TDD configuration, and frequency band B is unused.

Unfortunately, however, this solution is not optimal, since a frequency guard band that goes wholly unused is necessarily a waste of RF spectrum. Any efficiency that might arise from being able to use different TDD configurations on the adjacent frequency bands may be offset by the inefficiency of having unused spectrum on the intervening frequency band. Further, this arrangement would implement the second TDD configuration throughout the metropolitan region, even if it is only desired to implement the second TDD configuration in the stadium, perhaps specifically during the event there.

Another solution is for the network provider to implement a geographically localized guard band between the coverage areas that will use different TDD configurations than each other on the same or adjacent carriers. Namely, if the coverage areas would operate on the same TDD carrier as each other but with different TDD configurations than each other, then the network provider could implement a geographic buffer zone between the coverage areas, with no service being provided on that TDD carrier within the geographic buffer zone. Or if the coverage areas would operate on different TDD carriers than each other and with different TDD configurations than each other, then the network provider could implement a geographic buffer zone between the coverage areas, in which no service would be provided on a frequency guard band between the TDD carriers.

Figure 4:
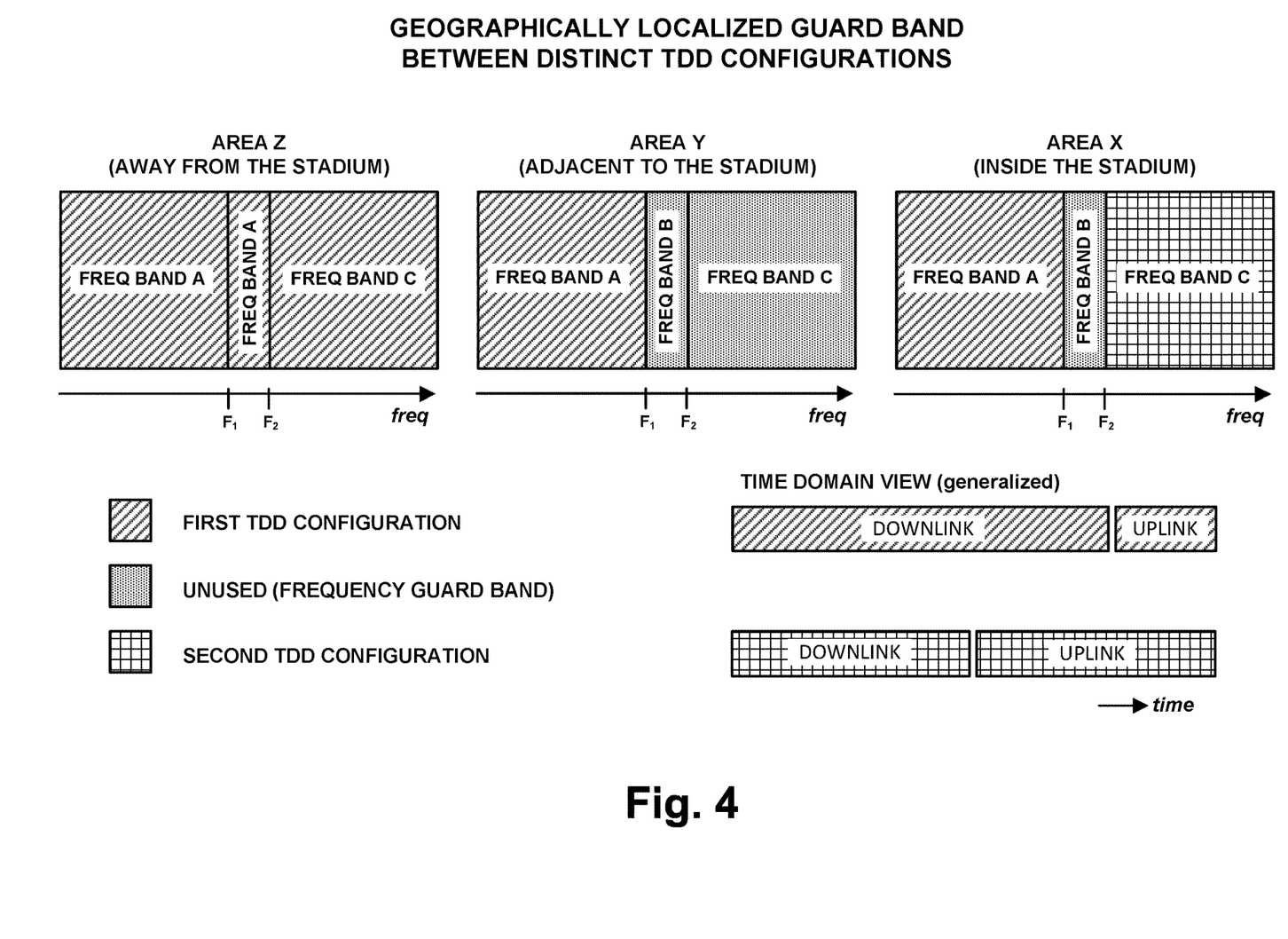
FIG. 4 is an illustration of a geographically localized guard band between distinct TDD configurations.

FIG. 4 illustrates how this solution could play out in practice, continuing with the example scenario above. As shown in FIG. 4, frequency band C is configured with the first TDD configuration in area Z and with the second TDD configuration in area X, but is unused in geographically intervening area Y. That way, on frequency band C, area Y serves as a geographic buffer zone between the two conflicting TDD configurations in areas Z and X. And as further shown, within areas Y and X, frequency band B is also unused, which serves the above described purpose (as shown in FIG. 3) in area X and further avoids a conflict on frequency band B in area Y.

But unfortunately, this solution is also not quite optimal. Although the geographically localized guard band would allow for some spectrum to use a different TDD configuration in the stadium than outside the stadium (beyond area Y) and would not require the same TDD configuration for the entire metropolitan area, it is still a waste of spectrum to have frequency band C go wholly unused in area Y and to have frequency band B go wholly unused in areas Y and X.

As noted above, the present disclosure provides an improved solution that involves implementing an enhanced TDD configuration within a frequency guard band or spatial guard band that is operatively between coverage areas operating on different TDD configurations than each other. As discussed above, the enhanced TDD configuration would be structured to be downlink just when the two coverage areas are downlink, to be uplink just when the two coverage areas are uplink, and to be unused when one of the two coverage areas is downlink and the other of the two coverage areas is uplink. That way, the enhanced TDD configuration would avoid conflicting with the TDD configurations of the two coverage areas.

Figure 5:
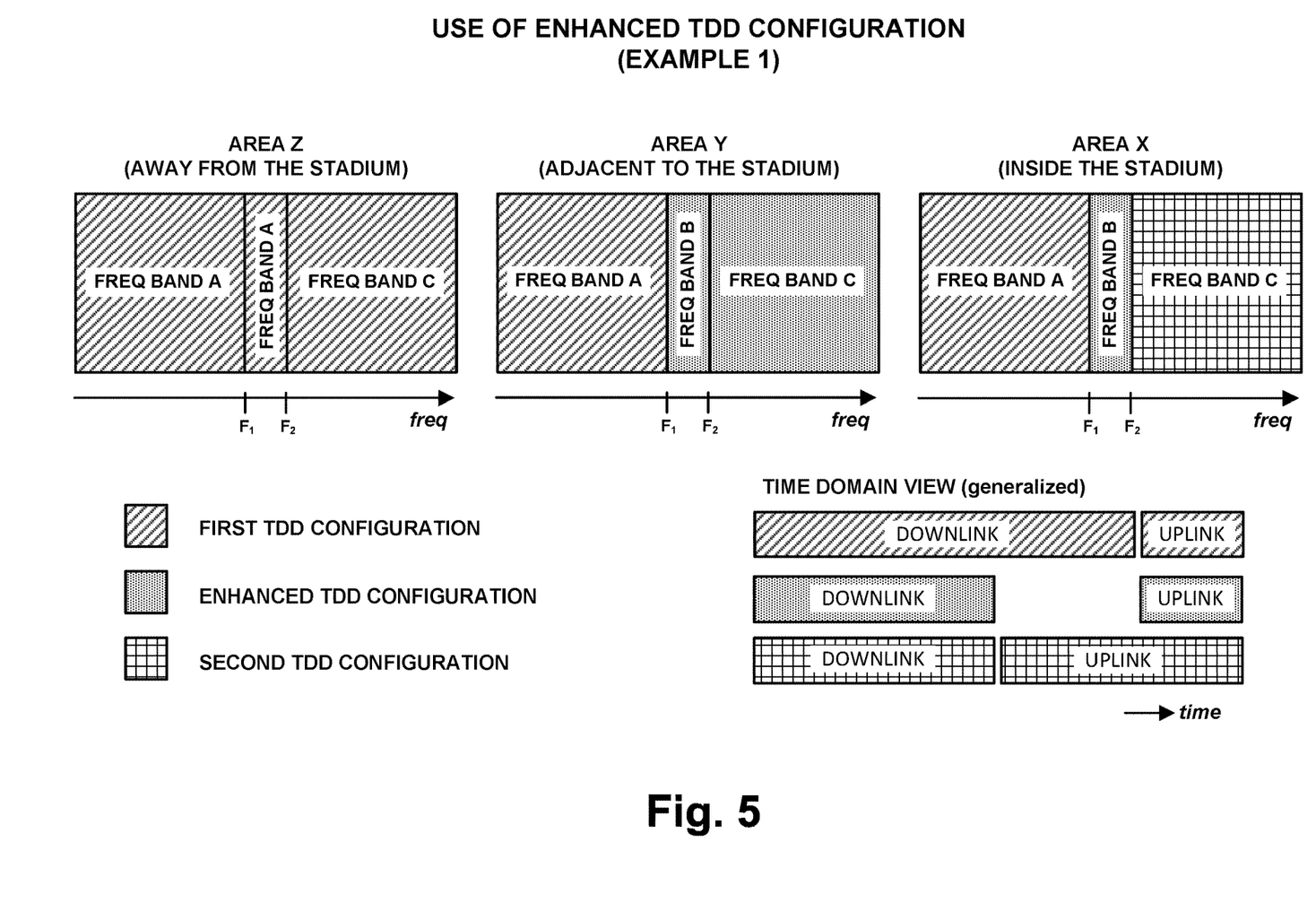
FIG. 5 is an illustration of an example implementation of an enhanced TDD configuration.

FIG. 5 illustrates an example of how this can work in practice. The arrangement shown in FIG. 5 parallels the arrangement shown in FIG. 4. However, in FIG. 5, instead of having frequency band C go unused in area Y, frequency band C in area Y is configured with the enhanced TDD configuration based on the first TDD configuration used on frequency band C in area Z and the second TDD configuration used on frequency band C in area X. And instead of having frequency band B go unused in areas Y and X, frequency band B in areas Y and X is likewise configured with the enhanced TDD configuration based on the first and second TDD configurations.

As shown in the bottom part of FIG. 5, the enhanced TDD configuration here is structured over time such that it is downlink just when the first TDD configuration and second TDD configuration are both downlink, and such that it is uplink just when the first TDD configuration and second TDD configuration are uplink. As such, given the inconsistency between the first and second TDD configurations, there would be one or more time intervals when the enhanced TDD configuration goes unused (provides no downlink or uplink), namely, when one of the first TDD configuration and second TDD configuration is downlink and the other of the first TDD configuration and second TDD configuration is uplink.

As an example, the enhanced TDD configuration based on the FC2 and FC1 TDD configurations discussed above would be downlink in subframes 0, 4, 5, and 9, based on FC2 and FC1 both being downlink in those subframes, and the enhanced TDD configuration would be uplink in subframes 2 and 7 based on FC2 and FC1 both being uplink in those subframes. Further, the enhanced TDD configuration in this example could also have subframes 1 and 6 configured as special subframes (part downlink and part uplink), as both FC2 and FC1 have those subframes as special subframes (and are thus both downlink at the same time as each other in those subframes and are both uplink at the same time as each other in those subframes).

For each area where the enhanced TDD configuration would be implemented on a given frequency band, one or more access nodes that provide the coverage in that area on that frequency band could be so configured to use the enhanced TDD configuration on the coverage that they provide there on that frequency band.

In a representative implementation, the one or more access nodes could be so configured to operate with the enhanced TDD configuration based on dynamically or statically provisioned information about what TDD configurations are or will be used on the adjacent frequency bands and/or in the adjacent areas.

By way of example, to provide the arrangement shown in FIG. 5, the one or more access nodes that provide coverage on frequency band C in area Y (adjacent to the stadium) could be statically configured to operate with the enhanced TDD configuration on frequency band C in area Y, with the enhanced TDD configuration being structured (i) to be downlink just when the first TDD configuration (used on frequency band C in area Z) is downlink and the second TDD configuration (used on frequency band C in area X) is downlink and (ii) to be uplink just when the first TDD configuration is uplink and the second TDD configuration is uplink. And likewise, the one or more access nodes that provide coverage on frequency band B in areas Y and X could be statically configured to operate with the same enhanced TDD configuration on frequency band B in areas Y and X.

The access nodes could be so statically configured through manual engineering input or other means, possibly based on automatic discovery of what TDD configurations are being used on the adjacent frequency bands and/or in the adjacent areas. The configuration of each such access node could involve the access node being set to broadcast an indication of its TDD configuration, namely, the enhanced TDD configuration. Here, the access node might broadcast on each of one or more carriers in the applicable frequency band an express listing of the downlink-uplink sequence that it will apply on the carrier, so that recipient UEs could learn to operate with that TDD configuration. Or the access node might broadcast on each such carrier a special TDD configuration index number that recipient UEs would be pre-provisioned to understand to mean the enhanced TDD configuration at issue.

Alternatively, the one or more access nodes that would provide the enhanced TDD configuration could be dynamically configured to do so, possibly based on dynamically changing TDD configuration(s) in either or each of the adjacent frequency bands and/or adjacent areas. Here, for instance, the one or more access nodes that provide coverage in either or each of adjacent frequency bands and/or adjacent areas could be programmed to provide output signaling indicating their current or planned use of a particular TDD configuration, and the one or more access nodes that provide coverage in the intervening frequency band and/or intervening area could receive that notice.

Given this or other information thus indicating what TDD configurations will be used in the adjacent frequency bands and/or adjacent areas, each access node providing coverage in the intervening frequency band and/or intervening area could determine that those TDD configurations conflict with each other. And responsive to that determination or otherwise responsive to learning the TDD configurations, each such access node could automatically set itself to use the enhanced TDD configuration on the intervening frequency band and/or intervening area, with the enhanced TDD configuration being based on the two conflicting TDD configurations as discussed above.

Other such dynamic mechanisms could be used as well. For instance, a centralized element management system or network configuration server could automatically configure use of the enhanced TDD configuration at times when desired or otherwise as desired. Further, the access nodes could be configured with program logic to carry out these or other such operations on a scheduled basis or in response to one or more other triggers.

Figure 6:
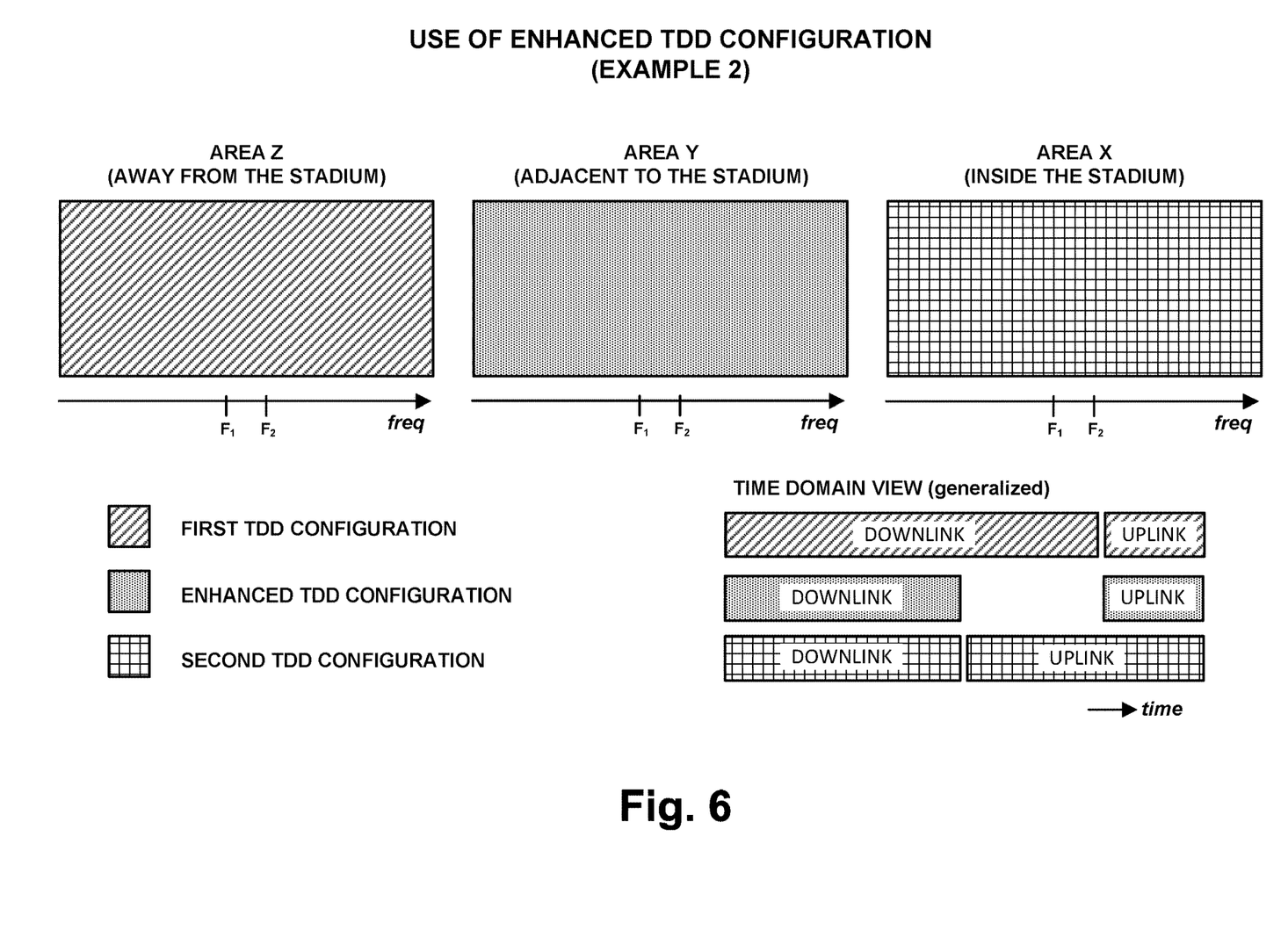
FIG. 6 is an illustration of another example implementation of an enhanced TDD configuration.

Various other implementations of such an enhanced TDD configuration could be possible as well. Without limitation, FIG. 6 shows another example, where a mobile network operator (MNO) has a license to RF spectrum encompassing frequency bands A, B, and C, in areas X, Y, and Z. As shown in FIG. 6, with this arrangement, the MNO could use the first TDD configuration in area Z, the MNO could use the second TDD configuration in area X, and the MNO could use the enhanced TDD configuration in area Y based on the first and second TDD configurations as discussed above. Still other examples are possible as well.

Further, note that, while the above discussion focuses on an example implementation where the enhanced TDD configuration is implemented in a guard band operatively between two coverage areas that use different TDD configurations than each other (e.g., in a frequency guard band between two frequency bands that use conflicting TDD configurations and/or in a spatial guard band between two areas that use conflicting TDD configurations), similar principles could apply with more than two conflicting adjacent TDD configurations.

For instance, consider a scenario where all of the coverage areas in a region operate on the same frequency as each other, where a particular coverage area overlaps with each of three other coverage areas, and where the three other coverage areas use different TDD configurations than each other. In that scenario, one or more access nodes that provide the particular coverage area could be configured to use the enhanced TDD configuration based on the three different TDD configurations. Here, the enhanced TDD configuration would be downlink just when all three TDD configurations are downlink and would be uplink just when all three TDD configurations are uplink, if feasible. Other examples are possible as well.

A representative method in line with the discussion above could thus be carried out to facilitate use of conflicting TDD configurations in first and second wireless coverage areas. The first and second wireless coverages could each be provided respectively by one or more access nodes and could differ from each other in terms of frequency and/or geographic scope of coverage. Further, as discussed above, the first wireless coverage area could use a first TDD configuration defining a first sequence of downlink and uplink time intervals and the second wireless coverage area could use a second TDD configuration defining a second sequence of downlink and uplink time intervals, with the first and second TDD configurations conflicting with each other in that there is at least one time interval when one of the first and second TDD configurations is downlink and the other of the first and second TDD configurations is uplink.

In this context, the method could include using an enhanced TDD configuration in an intervening wireless coverage area that is operatively between the first and second wireless coverage areas. And as discussed above, the enhanced TDD configuration could be structured to be downlink just when the first TDD configuration and second TDD configuration are both downlink and to be uplink just when the first TDD configuration and second TDD configuration are both uplink. Further, the enhanced TDD configuration could be structured to be unused when one of the first and second TDD configurations is downlink and the other of the first and second TDD configurations is uplink.

In line with the discussion above, the intervening wireless coverage area in this method could be operatively between the first and second wireless coverage areas by (i) operating on frequency that separates a first frequency on which the first wireless coverage area operates and a second frequency on which the second coverage area operates, and/or (ii) covering a geographic area that separates a first geographic area covered by the first wireless coverage area from a second geographic area covered by the second wireless coverage area.

In addition, the intervening wireless coverage area could be provided by one or more access nodes, and the act of using the enhanced TDD configuration in the intervening wireless coverage area could involve configuring the one or more access nodes to use the enhanced TDD configuration in the intervening wireless coverage area. For instance, this could involve programming each of the one or more access nodes (a) to engage in downlink communication in the intervening wireless coverage area just when the enhanced TDD configuration is downlink, and engage in uplink communication in the intervening wireless coverage area just when the enhanced TDD configuration is uplink and (b) to broadcast that the enhanced TDD configuration is in use in the intervening wireless coverage area, with the broadcasting operates serving to inform one or more UEs in the intervening wireless coverage area to use the enhanced TDD configuration.

Further, as discussed above, the act of configuring of the one or more access nodes to use the enhanced TDD configuration in the intervening wireless coverage area could be done statically or dynamically. And as for dynamic configuration, the configuration could be done due to current or soon-to-occur changing of the second wireless coverage area to use the second TDD configuration that conflicts with the first TDD configuration, such as proactively in view of a scheduled event or other trigger condition.

Still further, the method could additionally involve determining that the first TDD configuration and second TDD configuration conflict, in which case the act of using the enhanced TDD configuration in the intervening coverage areas could be responsive to at least that determination. And the method could involve determining what sequence of downlink and uplink time intervals the enhanced TDD configuration should have, based on a comparison of the first sequence of downlink and uplink time intervals of the first TDD configuration with the second sequence of downlink and uplink time intervals of the second TDD configuration. For instance, the method could involve carrying out that comparison in order to make that determination, so as to then set the enhanced TDD configuration accordingly.

An example implementation in line with the discussion above could further be characterized as a wireless communication system that is configured to facilitate use of conflicting TDD configurations in first and second wireless coverage areas. Such a wireless communication system could comprise (a) one or more first access nodes each including an associated antenna structure, the one or more first access nodes being configured to provide a first wireless coverage area using a first TDD configuration, (b) one or more second access nodes each including an associated antenna structure, the one or more second access nodes being configured to provide a second wireless coverage area using a second TDD configuration, and (c) one or more third access nodes each including an associated antenna structure, the one or more third access nodes being configured to provide a third wireless coverage area operatively between the first and second wireless coverage areas.

In such a system, each of the one or more third access nodes could be configured to use an enhanced TDD configuration in the third wireless coverage area. And based on the first and second TDD configurations, the enhanced TDD configuration could be structured to be downlink just when the first TDD configuration and second TDD configuration are both downlink and to be uplink just when the first TDD configuration and second TDD configuration are both uplink.

Various features discussed above can be implemented in this context as well, and vice versa.

Figure 7:
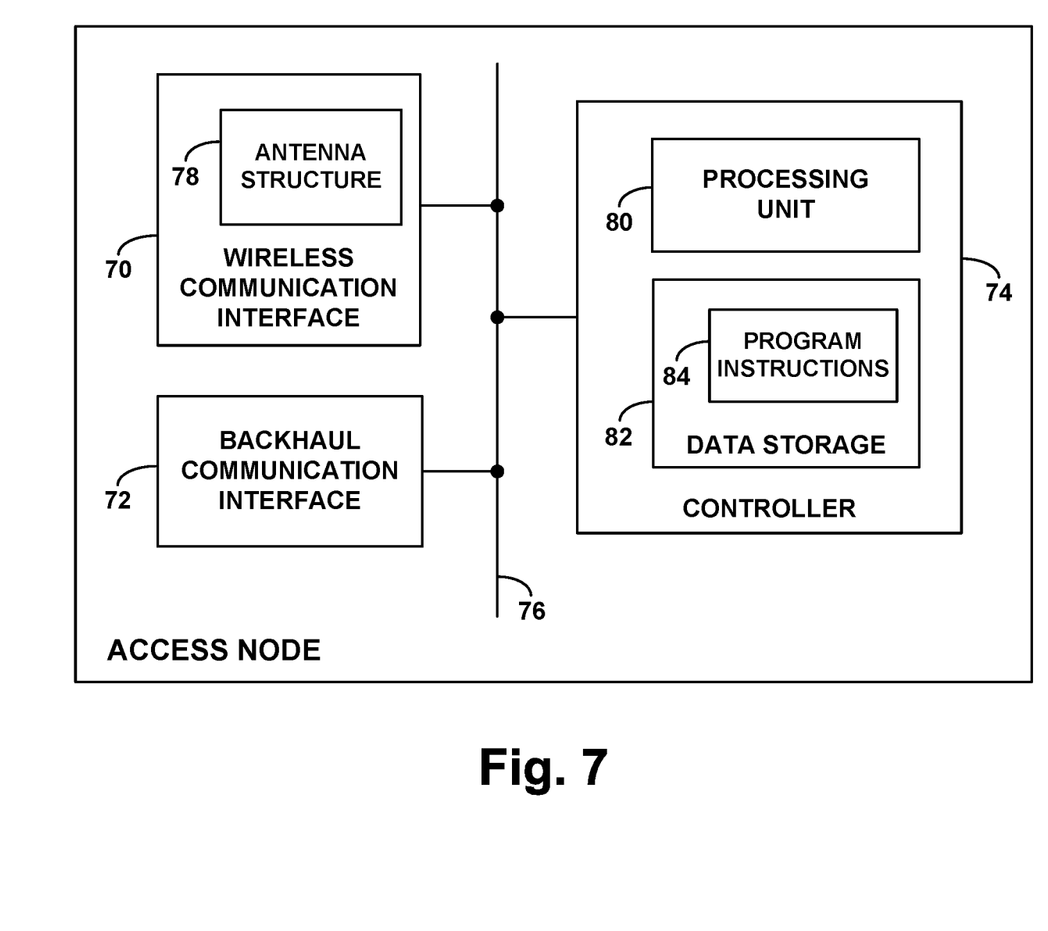
FIG. 7 is a simplified block diagram of an example access node.

Finally, FIG. 7 is a simplified block diagram of an example access node configured to facilitate use of conflicting TDD configurations in first and second wireless coverage areas. As discussed above, the first wireless coverage area could use a first TDD configuration defining a first sequence of downlink and uplink time intervals and the second wireless coverage area could use a second TDD configuration defining a second sequence of downlink and uplink time intervals, with the first and second TDD configurations conflicting as noted.

As shown in FIG. 7, the access node could include a wireless communication interface 70, a backhaul communication interface 72, and a controller 74, which could be integrated together in various ways and/or interconnected by a system bus, network, or other communication mechanism 76 as shown.

The wireless communication interface 70 could include a transceiver configured to serve UEs in accordance with one or more radio access technologies and could comprise one or more radios, amplifiers, and RF filters, as well as an antenna structure 78 for transmitting and receiving so as to provide coverage in an intervening wireless coverage area that is operatively between the first and second wireless coverage areas. And the backhaul wireless communication interface 72 could comprise a wired or wireless network communication module, such as an Ethernet interface, through which to communicate with other entities, perhaps with other access nodes and/or with one or more other entities on or via a core network.

Further, the controller 74 could comprise a processing unit 80 (e.g., one or more processing units such as microprocessors and/or specialized processors), non-transitory data storage 82 (e.g., one or more volatile and/or non-volatile storage components, such as magnetic, optical, or flash storage), and program instructions 84 stored in the data storage and executable by the processing unit to carry out, or cause the access node to carry out, various operations as described herein.

Various features discussed above can be implemented in this context, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

I claim:

1. A method to facilitate use of conflicting time-division-duplex (TDD) configurations in first and second wireless coverage areas,
   wherein the first wireless coverage area uses a first TDD configuration defining a first sequence of downlink and uplink time intervals and the second wireless coverage area uses a second TDD configuration defining a second sequence of downlink and uplink time intervals,
   wherein the first and second TDD configurations conflict in that there is at least one time interval when one of the first and second TDD configurations is downlink and the other of the first and second TDD configurations is uplink,
   the method comprising:

using an enhanced TDD configuration in an intervening wireless coverage area that is operatively between the first and second wireless coverage areas, wherein the enhanced TDD configuration is structured to be downlink just when the first TDD configuration and second TDD configuration are both downlink and to be uplink just when the first TDD configuration and second TDD configuration are both uplink.

2. The method of claim 1, wherein the enhanced TDD configuration is structured to be unused when one of the first and second TDD configurations is downlink and the other of the first and second TDD configurations is uplink.

3. The method of claim 1, wherein the intervening wireless coverage area is operatively between the first and second wireless coverage areas by at least one characteristic selected from the group consisting of:
 (i) operating on frequency that separates a first frequency on which the first wireless coverage area operates and a second frequency on which the second coverage area operates, and
 (ii) covering a geographic area that separates a first geographic area covered by the first wireless coverage area from a second geographic area covered by the second wireless coverage area.

4. The method of claim 1, wherein the intervening wireless coverage area is provided by one or more access nodes, and wherein using the enhanced TDD configuration in the intervening wireless coverage area comprises configuring the one or more access nodes to use the enhanced TDD configuration in the intervening wireless coverage area.

5. The method of claim 4, wherein configuring the one or more access nodes to use the enhanced TDD configuration in the intervening wireless coverage area comprises programming the one or more access nodes to each:
 engage in downlink communication in the intervening wireless coverage area just when the enhanced TDD configuration is downlink, and engage in uplink communication in the intervening wireless coverage area just when the enhanced TDD configuration is uplink, and
 broadcast that the enhanced TDD configuration is in use in the intervening wireless coverage area, wherein the broadcasting operates to inform one or more user equipment devices (UEs) in the intervening wireless coverage area to use the enhanced TDD configuration.

6. The method of claim 4, wherein the configuring of the one or more access nodes to use the enhanced TDD configuration in the intervening wireless coverage area is done statically.

7. The method of claim 4, wherein the configuring of the one or more access nodes to use the enhanced TDD configuration in the intervening wireless coverage area is done dynamically.

8. The method of claim 7, wherein the configuring of the one or more access nodes to use the enhanced TDD configuration in the intervening wireless coverage area is done upon changing of the second wireless coverage area to use the second TDD configuration that conflicts with the first TDD configuration.

9. The method of claim 1, further comprising determining that the first TDD configuration and second TDD configuration conflict, wherein the using is responsive to at least the determining.

10. The method of claim 1, further comprising determining what sequence of downlink and uplink time intervals the enhanced TDD configuration should have, based on a comparison of the first sequence of downlink and uplink time intervals of the first TDD configuration with the second sequence of downlink and uplink time intervals of the second TDD configuration.

11. A wireless communication system configured to facilitate use of conflicting time-division-duplex (TDD) configurations in first and second wireless coverage areas, the wireless communication system comprising:
 one or more first access nodes each including an associated antenna structure, the one or more first access nodes being configured to provide a first wireless coverage area using a first TDD configuration;
 one or more second access nodes each including an associated antenna structure, the one or more second access nodes being configured to provide a second wireless coverage area using a second TDD configuration; and
 one or more third access nodes each including an associated antenna structure, the one or more third access nodes being configured to provide a third wireless coverage area operatively between the first and second wireless coverage areas,
 wherein each of the one or more third access nodes is configured to use an enhanced TDD configuration in the third wireless coverage area, wherein, based on the first and second TDD configurations, the enhanced TDD configuration is structured to be downlink just when the first TDD configuration and second TDD configuration are both downlink and to be uplink just when the first TDD configuration and second TDD configuration are both uplink.

12. The wireless communication system of claim 11, wherein the enhanced TDD configuration is structured to be unused when one of the first and second TDD configurations is downlink and the other of the first and second TDD configurations is uplink.

13. The wireless communication system of claim 11, wherein the third wireless coverage area is operatively between the first and second wireless coverage areas by at least one characteristic selected from the group consisting of:
 (i) operating on frequency that separates a first frequency on which the first wireless coverage area operates and a second frequency on which the second coverage area operates, and
 (ii) covering a geographic area that separates a first geographic area covered by the first wireless coverage area from a second geographic area covered by the second wireless coverage area.

14. The wireless communication system of claim 11, wherein each of the one or more third access nodes is configured to use the enhanced TDD configuration in the third wireless coverage area by being configured to carry out operations including:
 engaging in downlink communication in the third wireless coverage area just when the enhanced TDD configuration is downlink, and engage in uplink communication in the intervening wireless coverage area just when the enhanced TDD configuration is uplink, and
 broadcasting that the enhanced TDD configuration is in use in the third wireless coverage area, wherein the broadcasting operates to inform one or more user equipment devices (UEs) in the third wireless coverage area to use the enhanced TDD configuration.

15. An access node configured to facilitate use of conflicting time-division-duplex (TDD) configurations in first and second wireless coverage areas, wherein the first wireless coverage area uses a first TDD configuration defining a first sequence of downlink and uplink time intervals and the second wireless coverage area uses a second TDD configuration defining a second sequence of downlink and uplink time intervals, wherein the first and second TDD configurations conflict in that there is at least one time interval when one of the first and second TDD configurations is downlink and the other of the first and second TDD configurations is uplink, the access node comprising:

a wireless communication interface including an antenna structure through which to provide coverage in an intervening wireless coverage area that is operatively between the first and second wireless coverage areas; and a controller including a processing unit, non-transitory data storage, and program instructions stored in the non-transitory data storage and executable by the processing unit to cause the access node to carry out operations including using an enhanced TDD configuration in the intervening wireless coverage area, wherein the enhanced TDD configuration is structured to be downlink just when the first TDD configuration and second TDD configuration are both downlink and to be uplink just when the first TDD configuration and second TDD configuration are both uplink.

16. The access node of claim 15, wherein the enhanced TDD configuration is structured to be unused when one of the first and second TDD configurations is downlink and the other of the first and second TDD configurations is uplink.

17. The access node of claim 15, wherein the intervening wireless coverage area is operatively between the first and second wireless coverage areas by at least one characteristic selected from the group consisting of:

(i) operating on frequency that separates a first frequency on which the first wireless coverage area operates and a second frequency on which the second coverage area operates, and (ii) covering a geographic area that separates a first geographic area covered by the first wireless coverage area from a second geographic area covered by the second wireless coverage area.

18. The access node of claim 15, wherein causing the access node to use the enhanced TDD configuring in the intervening wireless coverage area due to changing of the second wireless coverage area to use the second TDD configuration that conflicts with the first TDD configuration.

19. The access node of claim 15, wherein the operations further include determining that the first TDD configuration and second TDD configuration conflict, wherein the using is responsive to at least the determining.

20. The access node of claim 15, wherein the operations further include determining what sequence of downlink and uplink time intervals the enhanced TDD configuration should have, based on a comparison of the first sequence of downlink and uplink time intervals of the first TDD configuration with the second sequence of downlink and uplink time intervals of the second TDD configuration.

* * * * *